(12) United States Patent
Terashima et al.

(10) Patent No.: US 12,445,063 B2
(45) Date of Patent: Oct. 14, 2025

(54) CONTROL APPARATUS, ELECTRIC POWER CONVERSION APPARATUS, AND METHOD FOR DETECTING FAILURE OF AC CAPACITOR

(71) Applicant: TMEIC Corporation, Chuo-ku (JP)

(72) Inventors: Daiki Terashima, Tokyo (JP); Yoshihiro Tawada, Tokyo (JP); Tomoya Katsukura, Tokyo (JP); Issei Fukasawa, Tokyo (JP)

(73) Assignee: TMEIC CORPORATION, Chuo-ku (JP)

( * ) Notice: Subject to any disclaimer, the term of this patent is extended or adjusted under 35 U.S.C. 154(b) by 0 days.

(21) Appl. No.: 18/248,744

(22) PCT Filed: Sep. 29, 2021

(86) PCT No.: PCT/JP2021/035942
§ 371 (c)(1),
(2) Date: Apr. 12, 2023

(87) PCT Pub. No.: WO2023/053289
PCT Pub. Date: Apr. 6, 2023

(65) Prior Publication Data
US 2023/0402939 A1 Dec. 14, 2023

(51) Int. Cl.
*H02M 7/53* (2006.01)
*H02M 1/32* (2007.01)
*H02M 1/36* (2007.01)
*H02M 7/537* (2006.01)

(52) U.S. Cl.
CPC ............. *H02M 7/537* (2013.01); *H02M 1/32* (2013.01); *H02M 1/36* (2013.01)

(58) Field of Classification Search
CPC ............. H02M 7/537; H02M 1/32; H02M 1/36
See application file for complete search history.

(56) References Cited

U.S. PATENT DOCUMENTS

2017/0033593 A1\* 2/2017 Kamizuma ............. H02M 5/45

FOREIGN PATENT DOCUMENTS

JP 2017-212838 A 11/2017

OTHER PUBLICATIONS

International Search Report & Written Opinion issued Nov. 22, 2021 in PCT/JP2021/035942, filed on Sep. 29, 2021, 10 pages (with English Translation).

\* cited by examiner

*Primary Examiner* — Rafael O De Leon Domenech
(74) *Attorney, Agent, or Firm* — Oblon, McClelland, Maier &Neustadt, L.L.P.

(57) ABSTRACT

A control apparatus is a control apparatus for a power conversion apparatus including at least one AC capacitor disposed on the output side of an inverter and disconnected from a circuit when the AC capacitor malfunctions and including a current component extractor that acquires current values of the current flowing through the AC capacitor during synchronization control that synchronizes the output voltage from the inverter with a system voltage of a system, the synchronization control performed during activation of the power conversion apparatus with an AC switch on the side facing the system open, and extracts the value of a current component having a frequency synchronized with the frequency of the output voltage from the inverter out of the current values.

20 Claims, 10 Drawing Sheets

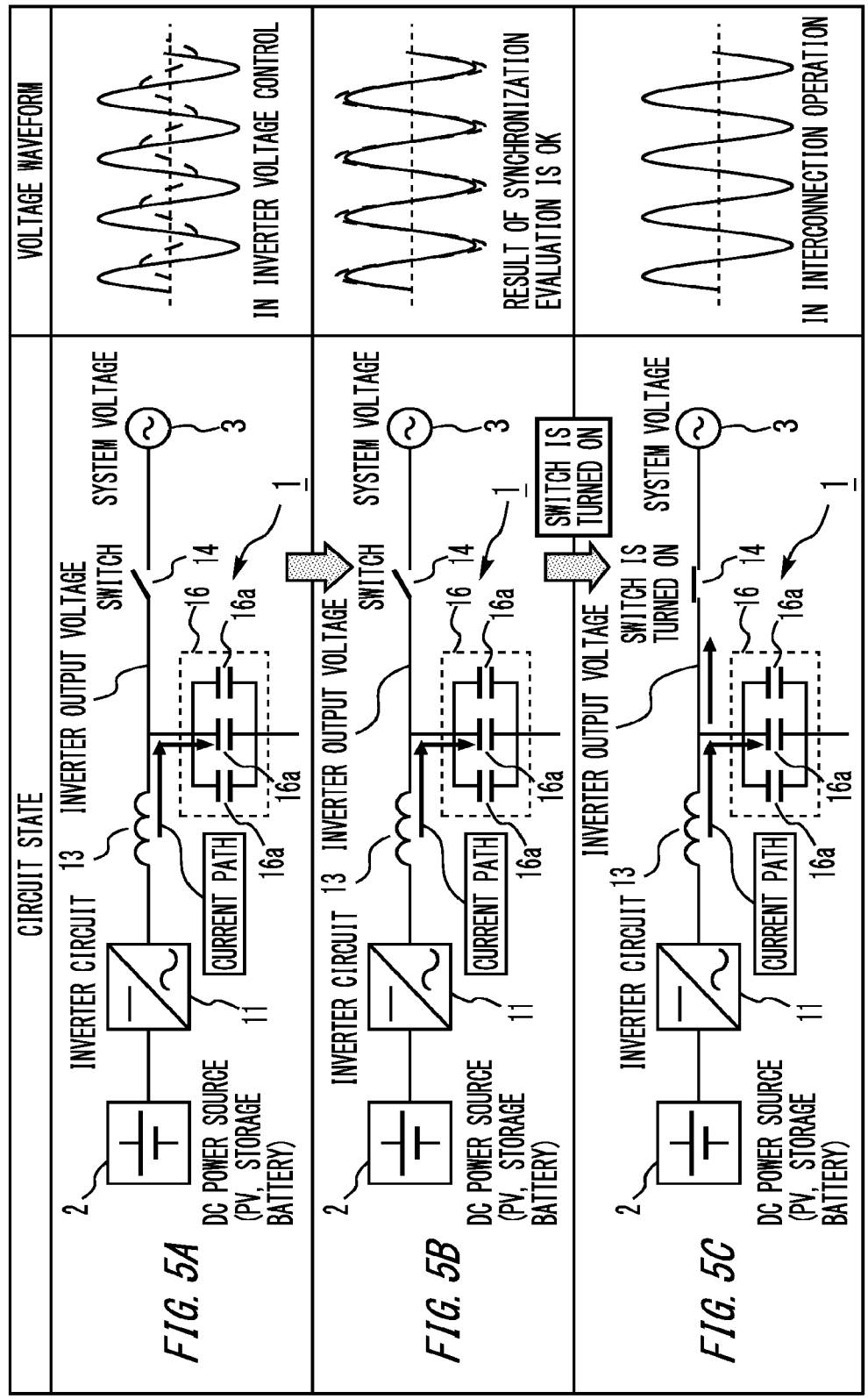

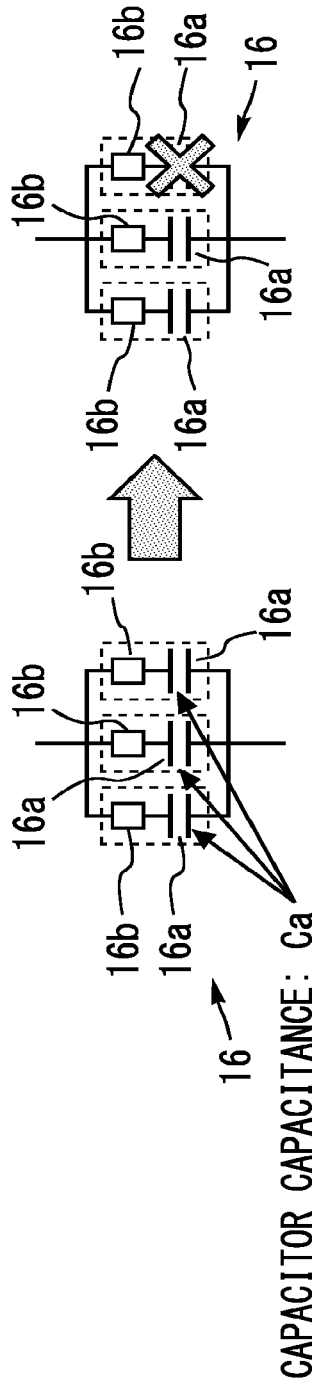

◆STATE IN WHICH POWER CONVERSION APPARATUS IS NOT IN OPERATION
→ AFTER ACTIVATION COMMAND IS INPUT

◆ABNORMALITY OCCURS IN AC CAPACITOR

CONTROL APPARATUS, ELECTRIC POWER CONVERSION APPARATUS, AND METHOD FOR DETECTING FAILURE OF AC CAPACITOR

FIELD

The present invention relates to a control apparatus, a power conversion apparatus, and a method for detecting failure of an AC capacitor.

BACKGROUND

There is a known power conversion apparatus of related art that performs voltage matching operation before starting system interconnection operation (before AC switch is turned on) and then starts the system interconnection operation (AC switch is turned on) (see Patent Literature 1, for example).

The voltage matching operation is control that synchronizes the output voltage from the power conversion apparatus with the system voltage before the system interconnection operation is started. For example, the voltage matching operation is performed by matching the amplitude and phase of the AC output voltage from the power conversion apparatus with the amplitude and phase of the system voltage. The voltage matching operation is performed, for example, by an alternating-current-automatic voltage regulator (AC-AVR). The voltage matching operation is also hereinafter referred to as "synchronous control" in the present specification.

CITATION LIST

Patent Literature

[PTL 1] JP 2017-212838 A

SUMMARY

Technical Problem

Some capacitors used as filters for the AC output from power conversion apparatuses each include a fuse mechanism that disconnects the capacitor element from the circuit in the event of abnormal overheating. When the fuse mechanism is activated, the AC capacitor operates in an open failure state. In this case, failure of the power conversion apparatus is typically detected as synchronization abnormality during the voltage matching operation.

The power conversion apparatuses of related art, however, do not detect the failure during the voltage matching operation in some cases even when open failure has occurred in the AC capacitor. In this case, the AC switch is turned on after the voltage matching operation, and the power conversion apparatus starts the system interconnection operation and then continues the operation in some cases without detecting the failure. When the AC capacitor is operated under the open failure, the power conversion apparatus could transmit large harmonics to the system, and the voltage application concentrates on the normal AC capacitors, so that the failure could spread to the normal AC capacitors.

An object of the present disclosure is to detect failure of a power conversion apparatus in voltage matching operation before system interconnection operation to allow the power conversion apparatus to notify failure information and the power conversion apparatus to stop operating before the system interconnection operation to prevent transmission of harmonics to the system and spread of the failure to normal AC capacitors.

Solution to Problem

A control apparatus according to an aspect is a control apparatus for a power conversion apparatus including at least one AC capacitor disposed on an output side of an inverter and disconnected from a circuit when the AC capacitor malfunctions, the control apparatus including a current component extractor that acquires current values of a current flowing through the AC capacitor during synchronization control that synchronizes an output voltage from the inverter with a system voltage of a system, the synchronization control performed during activation of the power conversion apparatus with an AC switch on a side facing the system open, and extracts a value of a current component having a frequency synchronized with a frequency of the output voltage from the inverter out of the current values, a failure evaluator that compares the value of the current component extracted by the current component extractor with a predetermined evaluation value in terms of magnitude, and determines that the AC capacitor malfunctions when the value of the current component is smaller than the predetermined evaluation value, and a failure information notifier that issues failure information representing that the AC capacitor malfunctions when the failure evaluator determines that the AC capacitor malfunctions during the synchronization control.

The control apparatus according to the aspect may further include an evaluation value calculator that acquires a voltage value of the output voltage from the inverter and determines the evaluation value used to evaluate the failure based on the voltage value, and the failure evaluator may compare the value of the current component extracted by the current component extractor with the evaluation value determined by the evaluation value calculator in terms of magnitude, and determines that the AC capacitor malfunctions when the value of the current component is smaller than the predetermined evaluation value.

In the control apparatus according to the aspect, the value of the current component may be a value of a q-axis current that is a value of a component having a phase 90 degrees ahead of a phase of the output voltage from the inverter, the value determined by dq-conversion performed on the current value by using a phase angle controlled based on the system voltage.

In the control apparatus according to the aspect, the value of the current component may be a value from which predetermined noise has been removed by using a predetermined lowpass filter.

In the control apparatus according to the aspect, the evaluation value may be a q-axis current theoretical value that is a value of a component having a phase 90 degrees ahead of a phase of the output voltage from the inverter, the value determined based on a voltage value of the output voltage from the inverter and a value of rated conductance of the AC capacitor.

In the control apparatus according to the aspect, the evaluation value may be a value that tolerates a predetermined error based on a value multiplied by a predetermined failure detection level.

The control apparatus according to the aspect may further include an operation controller that outputs an operation instruction that instructs the power conversion apparatus to stop operating when the failure evaluator determines that the AC capacitor malfunctions during the synchronous control.

A power conversion apparatus according to another aspect includes an inverter that converts power and outputs AC power, at least one AC capacitor that is provided in a capacitor circuit that branches off a three-phase AC circuit on an output side of the inverter and is disconnected from the circuit when the AC capacitor malfunctions, a current sensor that acquires a current value of a current flowing through the AC capacitor during synchronization control, and the control apparatus described in any one of the sections described above, and the current component extractor extracts the value of the current component based on the current value acquired by the current sensor.

In the power conversion apparatus according to the other aspect, the current sensor may be disposed in series connection with an AC reactor between the inverter and a branch point to the capacitor circuit in the three-phase AC circuit on the output side of the inverter.

In the power conversion apparatus according to the other aspect, the current sensor may be disposed in the capacitor circuit that branches off the three-phase AC circuit on the output side of the inverter.

A method for detecting failure of an AC capacitor according to another aspect is a method for detecting failure of an AC capacitor in a power conversion apparatus including the AC capacitor disposed on an output side of an inverter and disconnected from a circuit when the AC capacitor malfunctions, the method including a current component extraction step of acquiring current values of a current flowing through the AC capacitor during synchronization control that synchronizes an output voltage from the inverter with a system voltage of a system, the synchronization control performed during activation of the power conversion apparatus with an AC switch on a side facing the system open, and extracting a value of a current component having a frequency synchronized with a frequency of the output voltage from the inverter out of the current values, a failure evaluation step of comparing the value of the current component extracted in the current component extraction step with a predetermined evaluation value in terms of magnitude, and determining that the AC capacitor malfunctions when the value of the current component is smaller than the predetermined evaluation value, and a failure information notification step of issuing failure information representing that the AC capacitor malfunctions when the failure evaluation step determines that the AC capacitor malfunctions during the synchronization control.

Advantageous Effects of Invention

According to the present disclosure, failure is detected during voltage matching operation performed by a power conversion apparatus before system interconnection operation, whereby failure information can be issued and the power conversion apparatus can be stopped before the system interconnection operation, and transmission of harmonics toward the system and spread of the failure to normal AC capacitors can be suppressed.

BRIEF DESCRIPTION OF DRAWINGS

FIG. 5 shows an example of the operation of the power conversion apparatus in voltage matching operation (synchronous control).

FIG. 6 describes in the form of logic how a q-axis current decreases when an AC capacitor malfunctions.

DESCRIPTION OF EMBODIMENT

Embodiments of a control apparatus, a power conversion apparatus, and a method for detecting failure of an AC capacitor according to the present disclosure will be described below with reference to the drawings.

First Embodiment

Figure 1:
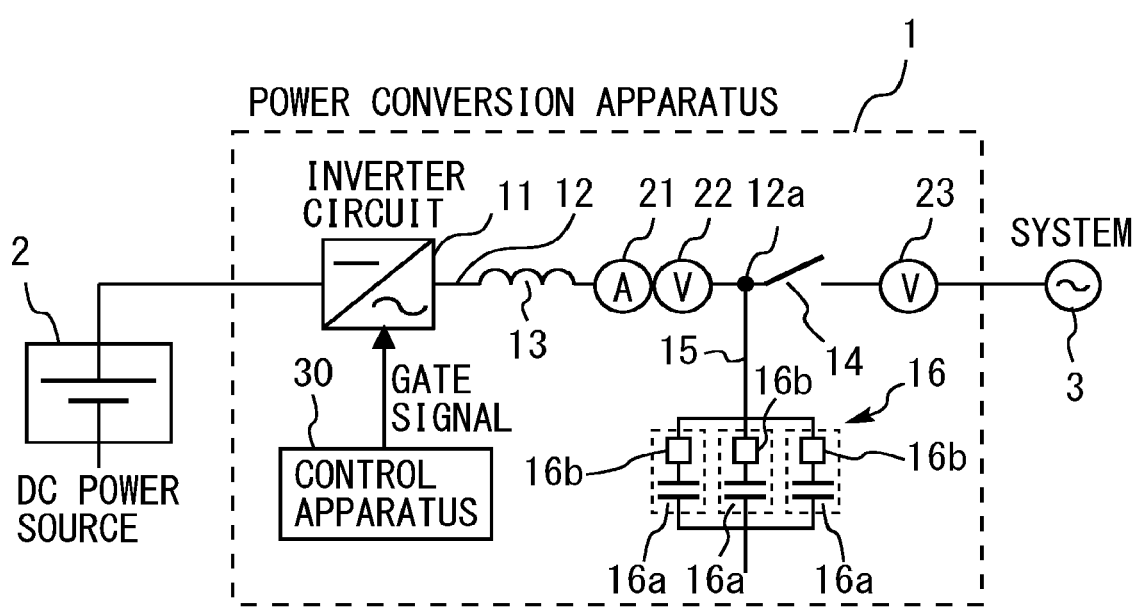
FIG. 1 shows an example of a control apparatus, a power conversion apparatus, and a method for detecting failure of an AC capacitor according to a first embodiment.

FIG. 1 shows an example of a control apparatus 30, a power conversion apparatus 1, and a method for detecting failure of an AC capacitor 16 according to a first embodiment. The power conversion apparatus 1 is connected to a DC power source 2 at one end of the power conversion apparatus 1 in the left portion of FIG. 1 and connected to an AC power system 3 (hereinafter also referred to as "system 3") at the other end of the power conversion apparatus 1 in the right portion of FIG. 1.

The power conversion apparatus (power conditioning subsystem: PCS) 1, for example, converts DC power supplied from the DC power source 2 into AC power, and outputs the converted AC power toward the system 3. The power conversion apparatus 1 is not limited to an apparatus that converts DC power into AC power, and may instead be an apparatus that converts AC power into AC power. The power conversion apparatus 1 may still instead be a power conversion apparatus for solar power generation (photovoltaic: PV) (photovoltaics-power conditioning subsystem: PV-PCS). The power conversion apparatus 1 may still instead be a power conversion apparatus for storage batteries (energy storage system: ESS) (energy storage system-power conditioning subsystem: ESS-PCS).

The DC power source 2 is connected to one end of the power conversion apparatus 1 and supplies the power conversion apparatus 1 with DC power via the one end of the power conversion apparatus 1. The DC power source 2 may, for example, be a solar power generator (PV) including a solar panel, a storage battery (ESS), or a DC power source system formed, for example, of a wind power generator and an AC-DC converter. The DC power source 2 is not necessarily connected to the one end of the power conversion apparatus 1, and an AC power source may be connected to the one end when the power conversion apparatus 1 converts AC power into AC power.

The AC power system (system) 3 is connected to the output end of the power conversion apparatus 1, which is the other end thereof, and is a system that integrates power generation, power conversion, power transmission, and power distribution to supply consumers' power receiving facilities with the AC power output from the power conversion apparatus 1. For example, an indefinite load is connected to the AC power system 3.

In FIG. 1, the power conversion apparatus 1 includes an inverter 11, an AC circuit 12, an AC reactor 13, an AC switch 14, a capacitor circuit 15, and the AC capacitor 16. The power conversion apparatus 1 further includes a current sensor 21, a first voltage sensor 22, a second voltage sensor 23, and a control apparatus 30.

The power conversion apparatus 1 includes the AC circuit 12 as an output circuit on the output side of the inverter 11, and the AC circuit 12 is provided with the AC reactor 13 and the AC switch 14. The AC circuit 12 branches into the capacitor circuit 15 via a branch point 12a between the AC reactor 13 and the AC switch 14, and the capacitor circuit 15 is connected to the AC capacitor 16. In the AC circuit 12, the current sensor 21 and the first voltage sensor 22 are disposed between the AC reactor 13 and the branch point 12a, and the second voltage sensor 23 is disposed on a side of the AC switch 14, the side facing the system 3. The control apparatus 30 is electrically connected, although no wiring is shown in FIG. 1, to each element of the power conversion apparatus 1.

The inverter (inverter circuit) 11 is formed of a plurality of switching elements such as insulated gate bipolar transistors (IGBTs). The inverter 11 has one end connected to the DC power source 2 and another end or the output-side end connected to the AC reactor 13. The inverter 11 is controlled by pulse width modulation (PWM) signals, which are gate drive signals (gate signals) that are generated by an inverter controller 32, which will be described later (see FIG. 3) and drive the gates of the switching elements. The inverter 11 acquires via the one end thereof the DC power supplied from the DC power source 2, converts the acquired DC power into AC power under the control of the PWM signals (gate signals), outputs the AC power via the other end, which is the output end, and supplies the AC circuit 12 with the AC power.

The AC circuit 12 has one end connected to the output end of the inverter 11 and another end connected to the system 3. The AC circuit 12 is, for example, a three-phase, three-wire AC circuit that uses three wires/cables to supply three-phase AC power that is a combination of single-phase ACs from three systems having current or voltage phases shifted from one another. The AC circuit 12 is hereafter also referred to as a "three-phase AC circuit 12" in the present specification.

The AC reactor 13 is also referred to as an alternating-current reactor and is connected in series to the AC circuit 12 on the output side of the inverter 11. The alternating-current reactor 13 is hereafter also referred to as the "AC reactor 13" in the present specification. The AC reactor 13 is, for example, a smoothing element that provides the effect of reducing noise and suppressing a surge voltage. The AC reactor 13 along with the AC capacitor 16 connected thereto in the form of an L-letter shape via the branch point 12a forms, for example, an LC filter circuit (filter circuit) that reduces ripples (vibration) produced when the switching elements, which are not shown but are provided in the inverter 11, perform switching.

The AC switch 14 is provided in series in the AC circuit 12 in a position shifted toward the system 3 from the branch point 12a of the LC filter circuit described above. The AC switch 14 connects the AC circuit 12 to the system 3 or releases the AC circuit 12 from the system 3 in accordance with a turn-on or release instruction from the control apparatus 30, a higher-level apparatus that is not shown, or an operator. Opening the AC switch 14 prevents the AC power supplied from the inverter 11 from being transmitted to the system 3. The AC switch 14 is opened when the power conversion apparatus 1 is activated and performs voltage matching operation (synchronization control) in conjunction with the system 3, whereas the AC switch 14 is turned on when the system interconnection operation is started.

The capacitor circuit 15 is a circuit that branches off via the branch point 12a between the AC reactor 13 and the AC switch 14 in the AC circuit 12, and the capacitor circuit 15 has one end connected to the branch point 12a and another end connected to the AC capacitor 16.

The AC capacitor 16, also referred to as an AC (alternating-current) capacitor and a filter capacitor, is an electronic part that stores or releases electricity (electric charge). The alternating-current capacitor 16 is hereafter also referred to as the "AC capacitor 16" in the present specification. The AC capacitor 16 along with the AC reactor 13 connected in the form of an L-letter shape forms, for example, an LC filter circuit (filter circuit) that reduces ripples (vibration) produced when the switching elements, which are not shown but are provided in the inverter 11, perform switching. The AC capacitor 16, which along with the AC reactor 13 forms the filter circuit, prevents harmonics (harmonic current) from being transmitted toward the system 3. The AC capacitor 16 only needs to be at least one AC capacitor to be disconnected in the event of failure from the circuit.

The AC capacitor 16 is formed, for example, of a plurality of AC capacitors 16a, into which the capacitor circuit 15 branches, connected to one another in parallel to gain capacitance or to satisfy a rated current. The plurality of AC capacitors 16a each include a safety mechanism 16b. In the present embodiment, the AC capacitor 16 is not necessarily formed of the AC capacitors 16a connected to one another in parallel, and at least one AC capacitor 16 including an AC capacitor 16a and a safety mechanism 16b only needs to be provided.

The safety mechanisms 16b are each, for example, a fuse or a switch, and plays the role of disconnecting the AC capacitor 16a from the circuit, for example, when the AC capacitor 16a malfunctions or when an abnormality occurs in the AC capacitor 16a so that the internal pressure in the AC capacitor 16a rises. The safety mechanism 16b is not limited to a fuse or a switch provided separately from the AC capacitor 16a, and may instead be a function that is provided in the AC capacitor 16a itself and disconnects the AC capacitor 16a in the event of a failure from the circuit.

The safety mechanisms 16b may disconnect the AC capacitors 16a separately from the circuit, or may disconnect predetermined packages of the plurality of AC capacitors 16a, which form the AC capacitor 16, separately from the circuit. That is, for example, when the plurality of predetermined packages of the plurality of AC capacitors 16a, which form the AC capacitor 16, are connected to one another in parallel, the safety mechanism 16b may be provided for each of the predetermined packages in the AC capacitor 16.

Figure 2:
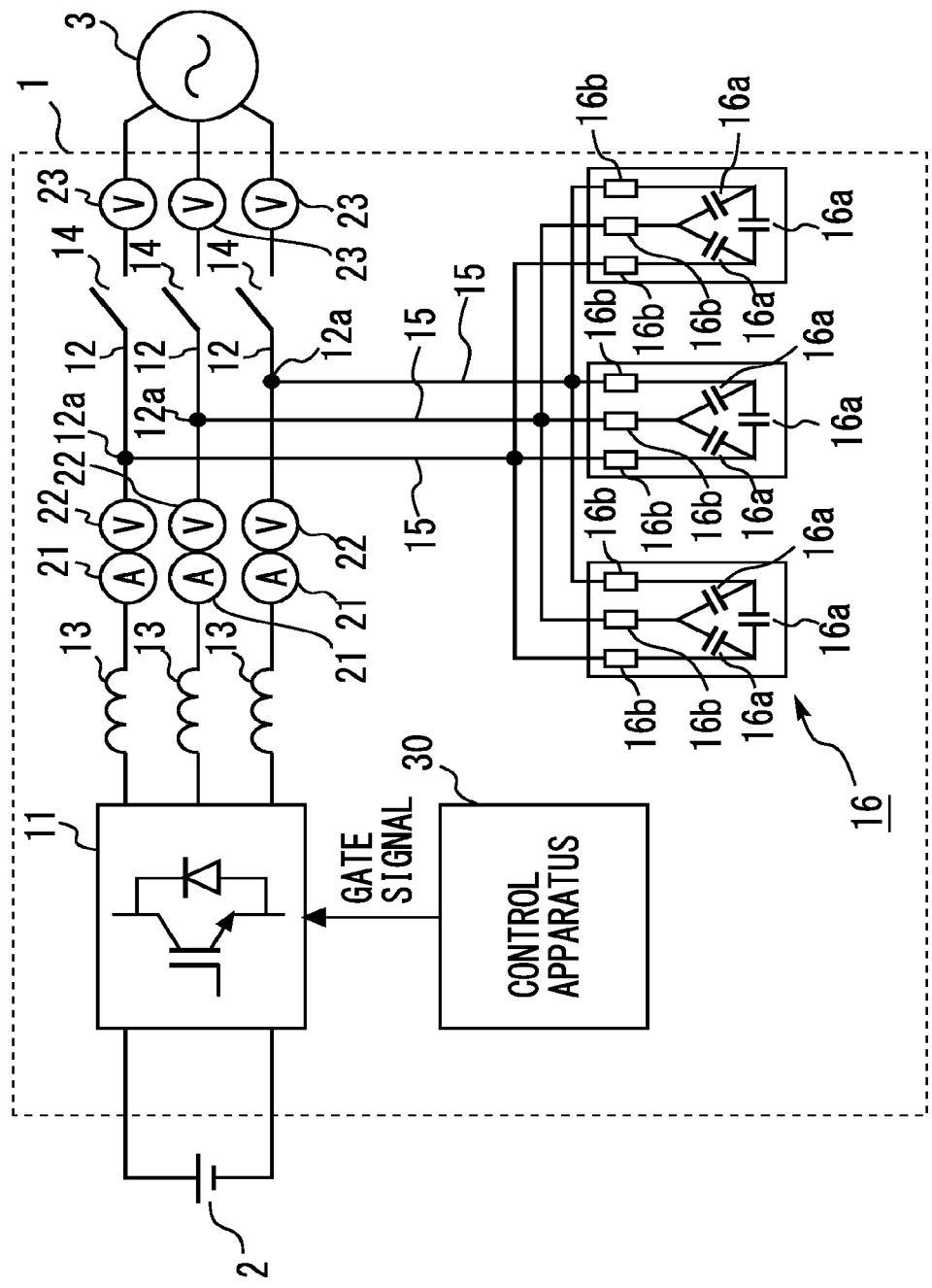
FIG. 2 shows an example of actual connection of AC capacitors in the power conversion apparatus shown in FIG. 1.

FIG. 2 shows an example of actual connection of the AC capacitor 16 in the power conversion apparatus 1 shown in FIG. 1. In FIG. 2, the configurations that are same as or similar to those in FIG. 1 have the same reference characters, and will not be described in detail or will be described in a simplified manner.

The AC circuit 12 is in practice a three-phase, three-wire AC circuit, and the above components including the AC capacitor 16 are in practice provided in the three-phase AC circuit 12, as shown in FIG. 2. In FIG. 1 and other figures, the components including the AC circuit 12 and the AC capacitor 16 are shown in simplified forms for simplicity of illustration.

In FIG. 2, the capacitor circuit 15 of the three-phase AC circuit 12 branches into a plurality of capacitor circuits 15 for the three phases (phases U, V, and W), which are connected in parallel to the AC capacitor 16 to gain capacitance or to satisfy the rated current. In FIG. 2, the capacitor circuits 15 for the three phases each branch into three, and three AC capacitors 16 are connected in parallel to one another on a phase basis, but the number of branches and the number of parallel connections are not limited to three. For example, the capacitor circuits 15 for the three phases may each branch into five, and five AC capacitors 16 may be connected in parallel to one another on a phase basis. The AC capacitors 16 are so packaged that a single package contains AC capacitors 16 for the three phases, and the AC capacitor packages may be connected in parallel to one another.

In each of the AC capacitor packages shown in FIG. 2, the AC capacitors 16 are delta-wired (Δ-wired). The AC capacitors 16 may instead be star-connected (Y-connected), or any other wiring scheme may be used. The AC capacitors 16 or AC capacitor packages connected in accordance with different wiring schemes may be mixed with one another and connected in parallel to one another. That is, the scheme of parallel connection of the AC capacitors 16 is not limited to a specific scheme. In FIG. 2, the safety mechanisms 16b and the AC capacitor 16a are provided in one-to-one relationship, and the safety mechanisms 16b may instead be disposed on an AC capacitor package basis as described above. The positions where the safety mechanisms 16b are disposed are not limited to the positions shown in FIG. 2, and may be any locations where the safety mechanisms 16b can each disconnect the AC capacitor 16 or 16a from the circuit when the AC capacitor malfunctions.

Referring back to FIG. 1, the current sensor 21 is disposed so as to be connected in series to the AC reactor 13 between the inverter 11 and the branch point 12a to the capacitor circuit 15 in the AC circuit 12 on the output side of the inverter 11. The current sensor 21 is, for example, a known AC ammeter or an AC current sensor, and detects current values $I_U$, $I_V$, and $I_W$ of the three-phase output current in the power conversion apparatus 1. The current values $I_U$, $I_V$, and $I_W$ detected by the current sensor 21 are acquired by the control apparatus 30.

The current sensor 21 only needs to be connected in series to the AC reactor 13 in the AC circuit 12 in any connection order. It is, however, noted that the current sensor 21 is provided between the inverter 11 and the branch point 12a in the AC circuit 12. The current sensor 21, which is provided in the position described above, can measure the current flowing through the AC capacitor 16 during the voltage matching operation (synchronous control) in which the AC switch 14 is open. In practice, since the current sensor 21 is already disposed in the position described above as specified in the specification in many power conversion apparatuses 1 of related art, the existing current sensor 21 having already been disposed can be used in the present embodiment.

The first voltage sensor 22 is disposed, for example, between the inverter 11 and the branch point 12a to the capacitor circuit 15 in the AC circuit 12 on the output side of the inverter 11. The first voltage sensor 22 is, for example, a known AC voltmeter or an AC voltage sensor, and detects a voltage value $V_i$ of the output voltage from the inverter 11. The voltage value $V_i$ of the output voltage detected by the first voltage sensor 22 is acquired by the control apparatus 30. The position where the first voltage sensor 22 is disposed may be any position where the voltage value $V_i$ of the output voltage from the inverter 11 can be measured, and is not limited to the position shown in FIG. 1.

The second voltage sensor 23 is disposed, for example, between the AC switch 14 in the AC circuit 12 on the output side of the inverter 11 and the system 3. The second voltage sensor 23 is, for example, a known AC voltmeter or an AC voltage sensor, and detects voltage values $V_U$, $V_V$, and $V_W$ of three-phase system voltage. The voltage values $V_U$, $V_V$, and $V_W$ detected by the second voltage sensor 23 are acquired by the control apparatus 30. The position where the second voltage sensor 23 is disposed may be any position where the voltage values $V_U$, $V_V$, and $V_W$ of the three-phase system voltage can be measured, and is not limited to the position shown in FIG. 1.

For example, the control apparatus 30 is provided in the power conversion apparatus 1 or external thereto, and is electrically connected to each of the elements of the power conversion apparatus 1, including the inverter 11, via wires or wirelessly, although the wiring is omitted in FIG. 1. The control apparatus 30 may be realized as a function of an inverter control circuit that is not shown.

The control apparatus 30 includes, for example, a processor that is not shown but operates by executing a program, such as a CPU (central processing unit), an MPU (micro processing unit), and a GPU (graphics processing unit). The control apparatus 30 includes, for example, a storage 40 (see FIG. 3) and a memory 92 (see FIG. 10), which will be described later, and executes a predetermined program stored in the storage 40 or the memory 92 to cause the processor that is not shown to operate to integrally control the operation of the power conversion apparatus 1. The control apparatus 30 may instead operate in accordance with instructions from, for example, an upper-level apparatus that is not shown or the operator via an operation section that is not shown. The control apparatus 30 detects failure of the AC capacitor 16 by using a detection logic, which will be described later, based on the current values detected by the current sensor 21 when the AC switch 14 is open.

Figure 3:
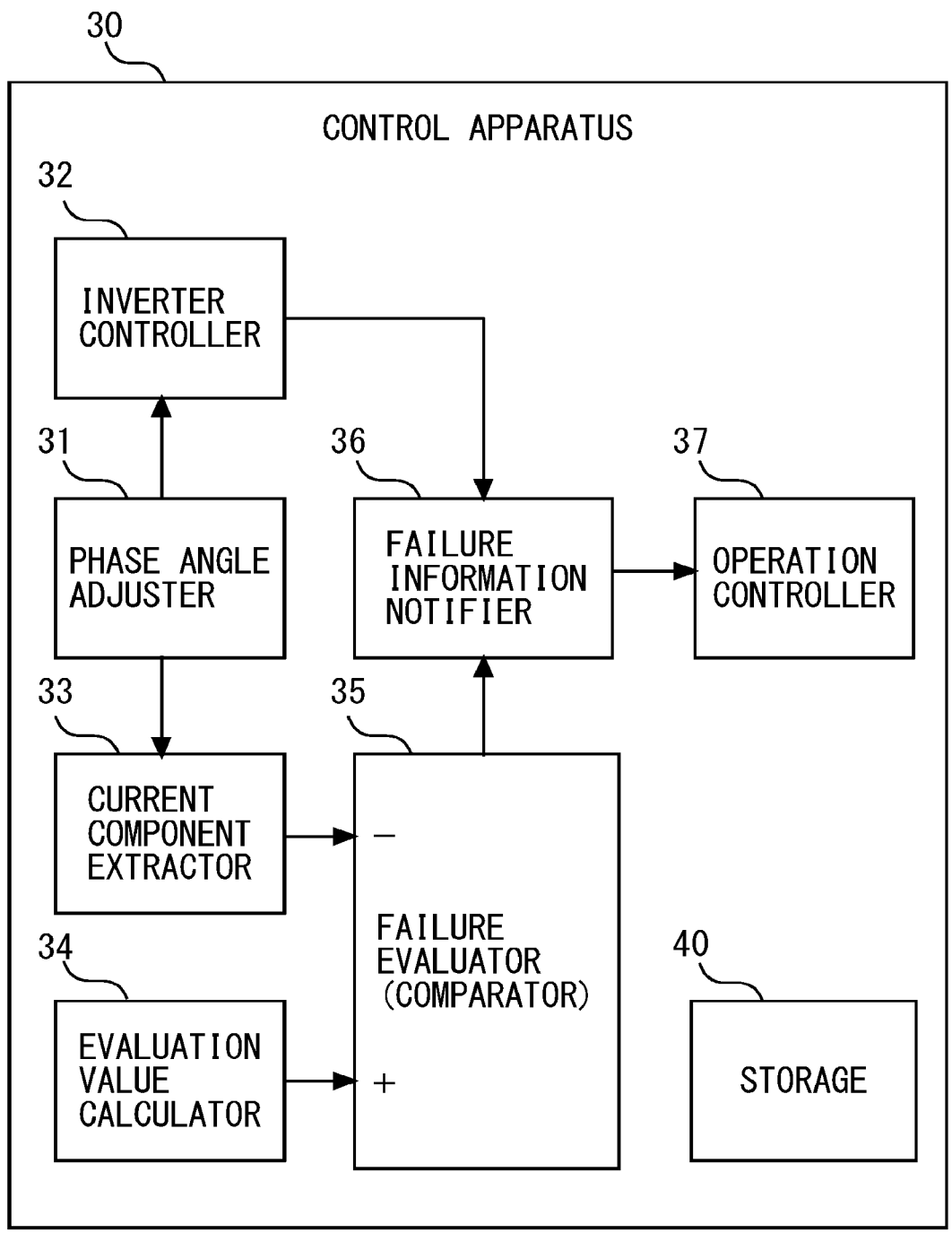
FIG. 3 shows an example of the configuration of the control apparatus in the power conversion apparatus shown in FIGS. 1 and 2.

FIG. 3 shows an example of the configuration of the control apparatus 30 in the power conversion apparatus 1 shown in FIGS. 1 and 2.

The control apparatus 30 includes the storage 40 and functions as the following sections by executing a predetermined program stored in the storage 40 or the memory 92 (see FIG. 10), which will be described later. The control apparatus 30 functions as a phase angle adjuster 31, an inverter controller 32, a current component extractor 33, an evaluation value calculator 34, a failure evaluator 35, a failure information notifier 36, and an operation controller 37. The functions described above may each be realized by a program executed by an arithmetic processing unit that is not shown but is provided in the control apparatus 30 or by hardware. The phase angle adjuster 31, the inverter controller 32, the current component extractor 33, the evaluation value calculator 34, the failure evaluator 35, the failure information notifier 36, and the operation controller 37 each execute a predetermined program to perform the following process.

The phase angle adjuster 31 acquires the voltage values $V_U$, $V_V$, and $V_W$, which are measured values of the three-phase (phases U, V, and W) system voltage, from the second voltage sensor 23. The phase angle adjuster 31, for example, converts the acquired three-phase voltage values $V_U$, $V_V$, and $V_W$ of the system voltage into two-phase voltage values (dq conversion) based on an arbitrary phase angle θ to determine a d-axis voltage $V_d$ and a q-axis voltage $V_q$. The phase angle adjuster 31 performs PLL (phase locked loop) control on the determined d-axis voltage $V_d$ and q-axis voltage $V_q$ to adjust the phase angle θ in such a way that the q-axis voltage $V_q$ becomes sufficiently smaller than the d-axis voltage $V_d$ (becomes zero).

The phase angle adjuster 31 performs the three-phase-to-two-phase conversion (dq conversion) on the three-phase voltage values $V_U$, $V_V$, and $V_W$ of the system voltage based on the adjusted phase angle θ, and outputs the d-axis component and the q-axis component. As a result, in the dq coordinate system, the axis q is set in the direction that is ahead of the axis d by 90 degrees in terms of phase. The phase angle adjuster 31 converts the three-phase voltage values $V_U$, $V_V$, and $V_W$ of the system voltage into two-phase voltage values (dq conversion) based on the adjusted phase angle θ to determine the d-axis voltage $V_d$ and the q-axis voltage $V_q$. The phase angle adjuster 31 outputs the determined d-axis voltage $V_d$ and q-axis voltage $V_q$ to the inverter controller 32. The phase angle adjuster 31 further outputs the adjusted phase angle θ to the current component extractor 33.

The inverter controller 32 acquires the d-axis voltage $V_d$ and the q-axis voltage $V_q$, which are determined based on the phase angle θ adjusted by the phase angle adjuster 31. The inverter controller 32 causes the acquired d-axis voltage $V_d$ and q-axis voltage $V_q$ to pass through a predetermined filter to perform two-phase-to-three-phase conversion (inverse conversion) thereon to determine inverter output voltage command values $V_U^*$, $V_V^*$, and $V_W^*$. The inverter controller 32 performs PWM (pulse width modulation) control on the determined inverter output voltage command values $V_U^*$, $V_V^*$, and $V_W^*$ to generate the gate signals.

The inverter controller 32 uses the generated gate signals to control the switching elements that are not shown but are provided in the inverter 11 to cause the power conversion apparatus 1 to perform the voltage matching operation (synchronous control). As a result of the control described above, the phase and amplitude of the output voltage from the inverter 11 roughly coincide with the phase and amplitude of the system voltage during the voltage matching operation (synchronous control). As a result, a d-axis current $I_d$ is a component in phase with the output voltage from the inverter 11, and a q-axis current $I_q$ is a component ahead of the output voltage from the inverter 11 in terms of phase by 90 degrees. Information on whether or not the power conversion apparatus 1 is in the voltage matching operation (synchronous control) is acquired as appropriate by the failure information notifier 36 from the inverter controller 32.

The current component extractor 33 acquires the current values $I_U$, $I_V$, and $I_W$, which are measured values of the three-phase (phases U, V, and W) output current from the inverter 11, from the current sensor 21. The current component extractor 33 converts the acquired three-phase current values $I_U$, $I_V$, and $I_W$, which are measured values of the output current, into two-phase current values (dq conversion) based on the phase angle θ adjusted by the phase angle adjuster 31 to determine the d-axis current $I_d$ and the q-axis current $I_q$. As a result of the PLL control performed by the phase angle adjuster 31 described above, the direction of the system voltage vector in the dq coordinate system coincide with the d-axis direction. Therefore, the d-axis current in the determined current component is a component in phase with the system voltage, and the q-axis current is a component ahead of the system voltage in terms of phase by 90 degrees. The current component extractor 33 extracts the q-axis current $I_q$ from the determined current component, causes the q-axis current $I_q$ to pass through a lowpass filter (LPF) to determine a q-axis current $I_{qf}$, and outputs the determined q-axis current $I_{qf}$ to the failure evaluator 35. The lowpass filter may be omitted.

The evaluation value calculator 34 acquires the voltage value $V_i$, which is a measured value of the output voltage from the inverter 11, from the first voltage sensor 22, and determines a d-axis voltage $V_{id}$, which is a measured value of the d-axis output voltage from the inverter 11, from the acquired voltage value $V_i$. The evaluation value calculator 34 calculates a capacitor q-axis current theoretical value $I_{qt}$ from the d-axis voltage $V_{id}$ and the rated conductance of the AC capacitor 16, which is a constant value. The evaluation value calculator 34 calculates an evaluation value by multiplying the calculated capacitor q-axis current theoretical value $I_{qt}$ by a predetermined failure detection level, and outputs the calculated evaluation value to the failure evaluator 35. Instead, a predetermined evaluation value stored, for example, in the storage 40 may be used as the evaluation value $I'_{qt}$, and the function of the evaluation value calculator 34 may be omitted.

The failure evaluator (comparator) 35 compares the q-axis current $I_{qf}$ determined by the current component extractor 33 with the evaluation value determined by the evaluation value calculator 34, in terms of magnitude. When the q-axis current $I_{qf}$ is smaller than the evaluation value $I'_{qt}$, the failure evaluator 35 determines that the AC capacitor 16 malfunctions. That is, for example, when at least one of the plurality of AC capacitors 16 malfunctions in the form of open failure, the q-axis current $I_q$ ($I_{qf}$) becomes smaller than a normal value, so that the failure evaluator 35 detects the small q-axis current $I_q$ and determines that the AC capacitor 16 malfunctions. When the failure evaluator 35 determines that the AC capacitor 16 malfunctions, the failure evaluator 35 outputs "1", which is a result of the evaluation representing failure, to the failure information notifier 36.

The failure information notifier 36 acquires as appropriate information on whether or not the power conversion apparatus 1 is in voltage matching operation (synchronization control), for example, from the inverter controller 32. When the failure evaluator 35 determines that the AC capacitor malfunctions, the failure information notifier 36 acquires "1", which is the result of the evaluation representing failure, from the failure evaluator 35. When the failure information notifier 36 acquires the information representing that the power conversion apparatus 1 is in voltage matching operation (synchronization control), and further acquires "1", which is the result of the evaluation representing that the AC capacitor 16 malfunctions, from the failure evaluator 35, the failure information notifier 36 issues the failure information. The failure information notifier 36 issues the failure information, for example, by outputting the failure information to a higher-level apparatus that is not shown, or by issuing a warning or an alarm to a display section, an operation section, or any other section that is not shown but is provided in the power conversion apparatus 1. The failure information notifier 36 further notifies the operation controller 37 of the failure information.

When the operation controller 37 acquires the failure information, which represents that the AC capacitor 16 malfunctions, issued from the failure information notifier 36, the operation controller 37 issues operation instructions that instruct stoppage of the power conversion apparatus 1 to each of the sections of the power conversion apparatus 1 to stop the power conversion apparatus 1 before the AC switch 14 is turned on. For example, when the operation controller 37 acquires information representing that a result of synchronization evaluation is OK from the inverter controller 32 but has not acquired the failure information, which represents that the AC capacitor 16 malfunctions, from the failure information notifier 36, the operation controller 37 may issue an operation instruction that instructs the AC switch 14 to be turned on to start the system interconnection operation.

The storage 40 is, for example, a volatile or nonvolatile storage medium, such as an HDD (hard disk drive), an SSD (solid state drive), a DRAM (dynamic random-access memory), or any other semiconductor memory. The storage 40 stores, for example, the programs necessary for the operation of the sections of the control apparatus 30, and writes and reads a variety of pieces of information to and from the sections of the control apparatus 30. The storage 40 further stores, for example, values acquired by the current sensor 21 and other sensors, the value of the rated conductance of the AC capacitor 16 used by the evaluation value calculator 34, and the value of the predetermined failure detection level or the predetermined evaluation value.

The storage 40 is connected to each of the sections of the control apparatus 30, for example, via a bus that is not shown. The storage 40 may be provided outside the control apparatus 30 and connected to the control apparatus 30 via wires or wirelessly, or may be an external storage medium, such as a memory card and a DVD (digital versatile disc), or may be an online storage.

Operation in First Embodiment

Figure 4:
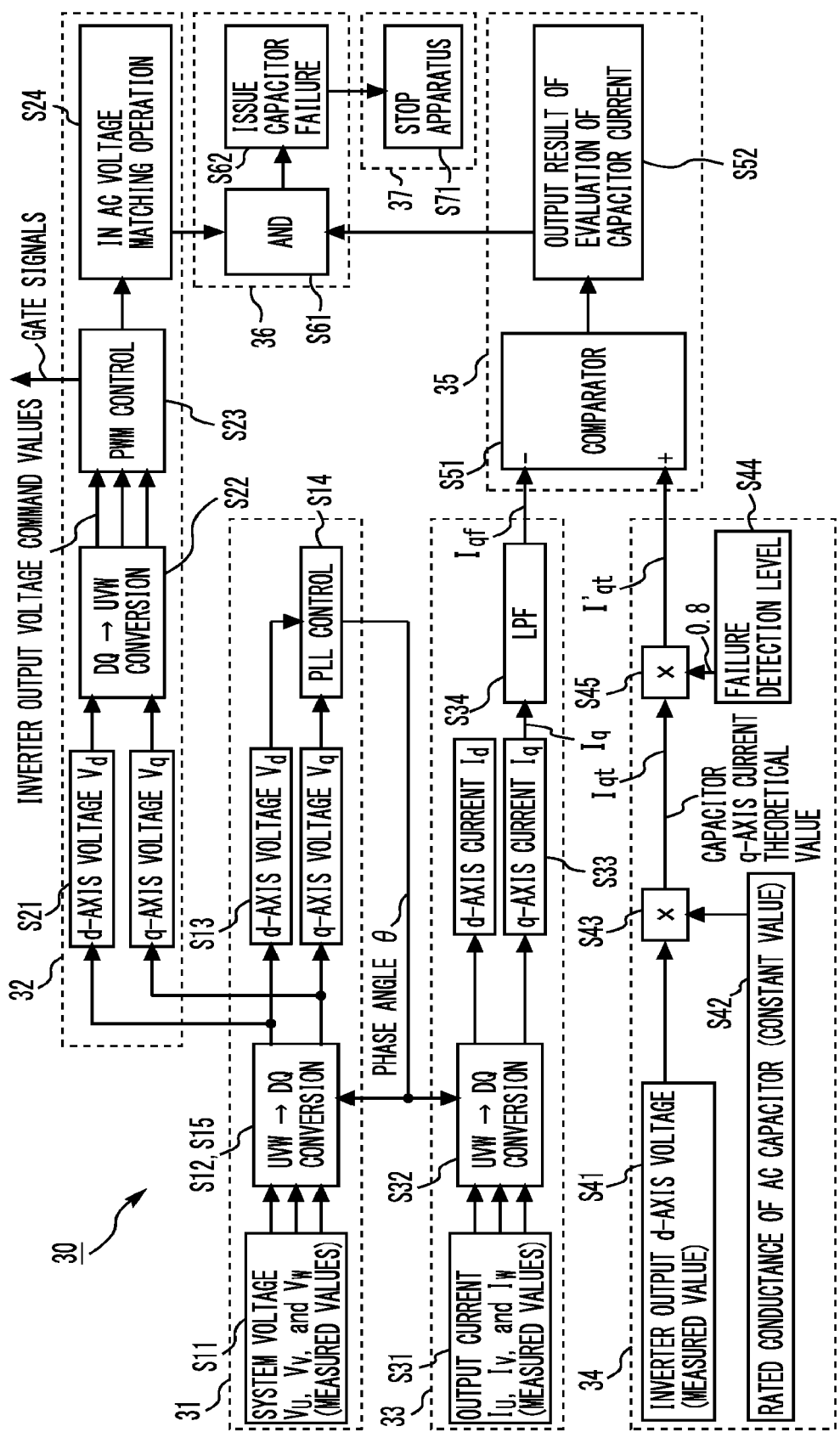
FIG. 4 shows an example of failure detection operation performed by the control apparatus shown in FIGS. 1 to 3.

FIG. 4 shows an example of the failure detection operation performed by the control apparatus 30 shown in FIGS. 1 to 3. The operation shown in FIG. 4 starts when the power conversion apparatus 1 starts (when activation command is accepted). That is, FIG. 4 shows an example of the failure detection operation performed by the control apparatus 30 during the voltage matching operation (synchronous control) at the startup of the power conversion apparatus 1.

In step S11, the phase angle adjuster 31 of the control apparatus 30 acquires the voltage values $V_U^*$, $V_V^*$, and $V_W^*$, which are the measured values of the three-phase (phases U, V, and W) system voltage, from the second voltage sensor 23, and transitions to the process in step S12.

In step S12, the phase angle adjuster 31 converts the acquired three-phase voltage values $V_U^*$, $V_V^*$, and $V_W^*$ of the system voltage into two-phase voltage values (dq conversion) based, for example, on an arbitrary phase angle θ to determine the d-axis voltage $V_d$ and the q-axis voltage $V_q$, and transitions to the process in step S13. The phase angle adjuster 31 further outputs the determined d-axis voltage $V_d$ and q-axis voltage $V_q$ to the inverter controller 32.

In step S13, the phase angle adjuster 31 acquires the determined d-axis voltage $V_d$ and q-axis voltage $V_q$, and transitions to the process in step S14.

In step S14, the phase angle adjuster 31 performs PLL (phase locked loop) control on the output d-axis voltage $V_d$ and q-axis voltage $V_q$ to adjust the phase angle θ in such a way that the q-axis voltage $V_q$ becomes sufficiently smaller than the d-axis voltage $V_d$ (become zero). The phase angle adjuster 31 outputs the adjusted phase angle θ and transitions to the process in step S15. The phase angle adjuster 31 further outputs the adjusted phase angle θ to the current component extractor 33.

In step S15, the phase angle adjuster 31 performs three-phase-to-two-phase conversion (dq conversion) on the three-phase voltage values $V_U^*$, $V_V^*$, and $V_W^*$ of the system voltage based on the adjusted phase angle θ to determine the d-axis component (d-axis voltage $V_d$) and the q-axis component (q-axis voltage $V_q$). As a result, in the dq coordinate system, the axis q is set in the direction that is ahead of the axis d by 90 degrees in terms of phase. The phase angle adjuster 31 then transitions to the process in step S13, and repeats the processes from step S13 to S15 during the voltage matching operation (synchronous control) of the power conversion apparatus 1. The phase angle adjuster 31 further outputs the determined d-axis voltage $V_d$ and q-axis voltage $V_q$ to the inverter controller 32.

In step S21, the inverter controller 32 of the control apparatus 30 initially acquires the d-axis voltage $V_d$ and the q-axis voltage $V_q$ output in step S12, and then acquires the d-axis voltage $V_d$ and the q-axis voltage $V_q$ output in step S15. The inverter controller 32 performs, for example, predetermined filtering on the acquired d-axis voltage $V_d$ and q-axis voltage $V_q$ and transitions to the process in step S22. It is noted that the predetermined filtering is not essential and may not be performed.

In step S22, the inverter controller 32 performs two-phase-to-three-phase conversion (inverse conversion) on the acquired d-axis voltage $V_d$ and q-axis voltage $V_q$ to determine the inverter output voltage command values $V_U^*$, $V_V^*$, and $V_W^*$, and transitions to the process in step S23. The reason why the three-phase-to-two-phase conversion (dq conversion) is temporarily performed on the voltage values $V_U$, $V_V$, and $V_W$ of the system voltage, and then the two-phase-to-three-phase conversion (inverse conversion) is performed is that it is easier to filter the two-axis d-axis voltage $V_d$ and q-axis voltage $V_q$ than to filter the three-phase voltage values $V_U$, $V_V$, and $V_W$.

In step S23, the inverter controller 32 performs PWM control on the determined inverter output voltage command values $V_U^*$, $V_V^*$, and $V_W^*$ to generate the gate signals. The inverter controller 32 uses the generated gate signals to control the switching elements of the inverter 11 to cause the power conversion apparatus 1 to perform the voltage matching operation (synchronous control), and transitions to the process in step S24. As a result of the control described above, the phase and amplitude of the output voltage from the inverter 11 roughly coincide with the phase and amplitude of the system voltage during the voltage matching operation (synchronous control). As a result, the d-axis current $I_d$ becomes a component in phase with the output voltage from the inverter 11, and the q-axis current $I_q$ becomes a component ahead of the output voltage from the inverter 11 in terms of phase by 90 degrees.

In step S24, the inverter controller 32 outputs the information representing whether or not the power conversion apparatus 1 is in the voltage matching operation (synchronization control). The information representing whether or not the power conversion apparatus 1 is in the voltage matching operation (synchronous control) is acquired as appropriate by the failure information notifier 36.

FIG. 5 shows an example of the operation of the power conversion apparatus 1 in the voltage matching operation (synchronous control). FIG. 5A shows the state of the power conversion apparatus 1 during the voltage matching operation (synchronization control) from the timing when the power conversion apparatus 1 starts to the timing when the power conversion apparatus 1 synchronizes with the system 3. FIG. 5B shows the state of the power conversion apparatus 1 synchronized with the system 3 as a result of the voltage matching operation (synchronization control) performed by the power conversion apparatus 1. FIG. 5C shows the state of the power conversion apparatus 1 performing the voltage matching operation (synchronization control) and synchronized with the system 3 so that the AC switch 14 is turned on.

In FIG. 5, the left side shows the circuit state. The left side of FIG. 5 shows the power conversion apparatus 1 shown in FIG. 1 with some of the components thereof omitted. On the left side of FIG. 5, the output voltage from the inverter 11 is applied to the left side of the AC switch 14, and the system voltage of the system 3 is applied to the right side of the AC switch 14. On the left side of FIG. 5, the arrows indicate the path of the current output from the inverter 11. The right side of FIG. 5 shows the voltage waveform. On the right side of FIG. 5, the solid line represents the waveform of the system voltage, and the broken line represents the waveform of the output voltage from the inverter 11.

In FIG. 5A, when the power conversion apparatus 1 starts (accepts activation command), the inverter 11 is controlled by the gate signals output from the inverter controller 32, so that voltage matching operation (synchronous control) is started. During the startup, since the inverter 11 is controlled by the gate signals based on an arbitrary phase angle θ, the voltage waveform of the output voltage from the inverter 11 and the voltage waveform of the system voltage are initially in disorder (S12, S21 to S23).

In FIG. 5B, as a result of the voltage matching operation (synchronization control), the result of the synchronization evaluation becomes OK. That is, the phase angle adjuster 31 performs PLL control based on the three-phase voltage values $V_U$, $V_V$, and $V_W$ acquired from the system voltage to adjust the phase angle θ (S14). Thereafter, as the inverter 11 is controlled by the gate signals based on the adjusted phase angle θ, the phase and amplitude of the output voltage from the inverter 11 roughly coincide with the phase and amplitude of the system voltage (S15, S21 to S23).

In FIG. 5C, when the result of the synchronization evaluation becomes OK, the voltage waveform of the output voltage from the inverter 11 and the voltage waveform of the system voltage roughly coincide with each other, so that the AC switch 14 is turned on in response, for example, to the operation instruction from the operation controller 37, and the system interconnection operation is started.

Referring back to FIG. 4, in step S31, the current component extractor 33 of the control apparatus 30 acquires the current values $I_U$, $I_V$, and $I_W$, which are measured values of the three-phase (phases U, V, and W) output current from the inverter 11, from the current sensor 21, and transitions to the process in step S32. The current sensor 21 keeps measuring the current values $I_U$, $I_V$, and $I_W$, and the current component extractor 33 keeps acquiring the current values $I_U$, $I_V$, and $I_W$.

In step S32, the current component extractor 33 converts the acquired three-phase current values $I_U$, $I_V$, and $I_W$, which are the measured values of the output current, into two-phase current values (dq conversion) based on the phase angle θ adjusted by the PLL control in step S14 to determine the d-axis current $I_d$ and the q-axis current $I_q$. In step S14, the phase angle adjuster 31 adjusts the phase angle θ in such a way that the q-axis voltage $V_q$ is sufficiently smaller than the d-axis voltage $V_d$ (becomes zero). Therefore, as a result of the PLL control in step S14, the direction of the system voltage vector in the dq coordinate system coincides with the d-axis direction. Therefore, the d-axis current $I_d$ in the determined current component becomes a component in phase with the system voltage, and the q-axis current $I_q$ becomes a component ahead of the system voltage in terms of phase by 90 degrees.

In step S33, the current component extractor 33 extracts the q-axis current $I_q$ from the determined current component and transitions to the process in step S34. When the dq conversion is so performed that the q-axis voltage $V_q$ is zero, that is, only the d-axis voltage is seen, the d-axis current $I_d$ does not change even when the capacity of the AC capacitor 16 decreases, so that the d-axis current $I_d$ does not affect the detection of failure of the AC capacitor 16. That is, since the current flowing through the AC capacitor 16 (capacitor current) only appears in the q-axis current $I_q$, the current component extractor 33 extracts only the q-axis current $I_q$ from the determined current component.

In step S34, the current component extractor 33 performs filtering using a lowpass filter (LPF) on the extracted q-axis current $I_q$ to determine the q-axis current $I_{qf}$. The lowpass filter used in step S34 is a filter that removes components having frequencies different from the frequency of the system voltage. The filtering using the lowpass filter performed on the q-axis current $I_q$ further removes a DC offset produced by the current sensor 21. Furthermore, performing the filtering using the lowpass filter allows extraction of only the current flowing through the AC capacitor 16 even when the AC capacitor 16 has small capacitor capacitance and therefore produces a small capacitor current. The current component extractor 33 outputs the determined q-axis current $I_{qf}$ to the failure evaluator 35. It is noted that the lowpass filter is not essential and may be omitted. The process in step S34 may therefore be omitted.

In step S41, the evaluation value calculator 34 acquires the voltage value $V_i$, which is a measured value of the output voltage from the inverter 11, from the first voltage sensor 22, and determines the d-axis voltage $V_{id}$, which is a measured value of the d-axis output voltage from the inverter 11, from the acquired voltage value $V_i$. After determination of the d-axis voltage Via, the evaluation value calculator 34 transitions to the process in step S43.

In step S42, the evaluation value calculator 34 acquires the value of the rated conductance (constant value) of the AC capacitor 16 stored, for example, in the storage 40 and transitions to the process in step S43.

In step S43, the evaluation value calculator 34 calculates the capacitor q-axis current theoretical value $I_{qt}$ by multiplying the determined d-axis voltage $V_{id}$ by the acquired rated conductance (constant value) of the AC capacitor 16, and transitions to the process in step S45.

In step S44, the evaluation value calculator 34 acquires the value of the predetermined failure detection level stored in the storage 40, for example, and transitions to the process in step S45. The value of the failure detection level is, for example, 0.8.

In step S45, the evaluation value calculator 34 multiplies the calculated capacitor q-axis current theoretical value $I_{qt}$ by the acquired failure detection level (0.8, for example) to calculate the evaluation value $I'_{qt}$. The evaluation value calculator 34 outputs the calculated evaluation value $I'_{qt}$ to the failure evaluator 35. The multiplication of the capacitor q-axis current theoretical value $I_{qt}$ by the failure detection level is not essential and may be omitted. In this case, the capacitor q-axis current theoretical value $I_{qt}$ calculated in step S43 is output as the evaluation value $I'_{qt}$ to the failure evaluator 35, and the processes in steps S44 and S45 may be omitted.

A predetermined evaluation value stored, for example, in the storage 40 may be used as the evaluation value $I'_{qt}$. In this case, all functions of the evaluation value calculator 34 may be omitted. The reason for this is that using the evaluation value $I'_{qt}$ calculated by the evaluation value calculator 34 and using a predetermined evaluation value that is a constant value in the first place are believed to provide the same effect. That is, the capacitor q-axis current theoretical value $I_{qt}$ (evaluation value $I'_{qt}$) is calculated based on the d-axis voltage $V_{id}$ in the voltage value $V_i$, which is a measured value of the output voltage from the inverter 11, but the inverter 11 operates in conjunction with the system 3. Since the system voltage of the system 3 typically roughly coincides with a predetermined voltage value, the d-axis voltage $V_{id}$ of the inverter 11 is also in practice roughly constant in many cases although it fluctuates in an exact sense. It is therefore believed that the d-axis voltage $V_{id}$ of the inverter 11 multiplied by the rated conductance of the capacitor, which is a constant value, is also a constant value.

In step S51, the failure evaluator (comparator) 35 acquires the q-axis current $I_{qf}$ determined by the current component extractor 33 and the evaluation value $I'_{qt}$ determined by the evaluation value calculator 34, compares the two values in terms of magnitude, and evaluates whether or not the AC capacitor 16 malfunctions. When the q-axis current $I_{qf}$ is smaller than the evaluation value $I'_{qt}$, the failure evaluator 35 determines that the AC capacitor 16 malfunctions. That is, for example, when an open failure occurs in at least one of the plurality of AC capacitors 16, the value of the q-axis current $I_{qf}$ ($I_q$) becomes smaller than a normal value, so that the failure evaluator 35 detects the small value of the current and determines that the AC capacitor 16 malfunctions. When the evaluation value calculator 34 is omitted, the q-axis current $I_{qf}$ and a predetermined evaluation value stored, for example, in the storage 40 may be acquired, and whether or not the AC capacitor 16 malfunctions may be evaluated by comparing the two values with each other in terms of magnitude. The failure evaluator 35 transitions to the process in step S52 after evaluating whether or not the AC capacitor 16 malfunctions.

In step S52, when the failure evaluator 35 determines that the AC capacitor 16 malfunctions, the failure evaluator 35 outputs "1", which is a result of the evaluation representing that the capacitor 16 malfunctions, to the failure information notifier 36. When the failure evaluator 35 determines that the AC capacitor 16 does not malfunction, the failure evaluator 35 may output "0", which is a result of the evaluation representing that the AC capacitor 16 does not malfunction, to the failure information notifier 36, or may output nothing until the failure evaluator 35 determines that the AC capacitor 16 malfunctions.

FIG. 6 describes in the form of logic how the q-axis current decreases when the AC capacitor 16 malfunctions.

First, it is assumed that no abnormality has occurred in the AC capacitor 16, and the q-axis current of the AC capacitor 16 has the capacitor q-axis current theoretical value $I_{qt}$ of the AC capacitor 16. It is noted that f represents the frequency of the applied voltage, C represents the capacitor capacitance, and $V_{id}$ represents the inverter output voltage d-axis component. In this case, the capacitor q-axis current theoretical value $I_{qt}$ of the AC capacitor 16 is determined by Expression (1) below.

[Math.1]

$$I_{qt} = 2\pi f C V_{id} \quad (1)$$

Now, examine, for example, a case where the AC capacitor 16 is formed of three AC capacitors 16a arranged in a row. It is noted that Ca represents the capacitance of the AC capacitors 16a. In this case, the capacitor q-axis current theoretical value $I_{qt}$ in a case where no abnormality has occurred in any of the three AC capacitors 16a is determined by Expression (2) below.

[Math.2]

$$I_{qt} = 2\pi f \times (3Ca) \times V_{id} \quad (2)$$

In this case, a capacitor current $I''_{qt}$ in a case where one of the AC capacitors 16a malfunctions in the form of open failure is determined by Expression (3) below.

$$I''_{qL} = 2\pi f \times (2Ca) \times V_{id} = \frac{2}{3} I_{qL} \quad (3)$$

According to Expressions (2) and (3), when no abnormality has occurred in any of the AC capacitors 16a, the capacitor current should have the capacitor q-axis current theoretical value $I_{qt}$. When one of the AC capacitors 16a malfunctions in the form of open failure, however, the capacitor current decreases to (2/3) $I_{qt}$.

Figure 7A:
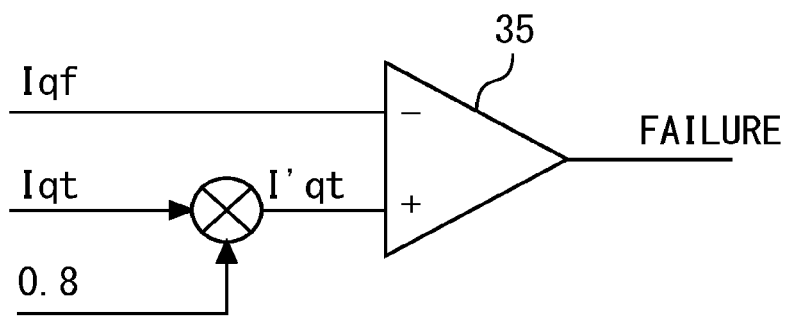
FIG. 7 describes a failure detection logic in step S51 of FIG. 4.

FIG. 7 describes the failure detection logic in step S51 of FIG. 4. In FIG. 7A, the central comparator represents the failure evaluator 35. The upper left $I_{qf}$ is the q-axis current $I_{qf}$ determined in step S34, the center left $I_{qf}$ is the q-axis current theoretical value $I_{qt}$ determined in step S43, and the lower left 0.8 is the failure detection level value acquired in step S44. FIG. 7A shows that the q-axis current $I_{qf}$ and the evaluation value $I'_{qt}$ (which is the value as a result of multiplication of the capacitor q-axis current theoretical value $I_{qt}$ by 0.8, which is the value of the failure detection level) are output to the failure evaluator 35.

The value of the failure detection level is a value smaller than 1 and is 0.8 as an example in the present embodiment. In general, when the AC capacitor 16 normally operates, the q-axis current $I_{qf}$ determined from the current value (measured value) of the current flowing through the AC capacitor 16 and the capacitor q-axis current theoretical value $I_{qt}$ determined from the voltage value (measured value) of the output voltage from the inverter 11 should have the same value. In consideration of an error, however, to tolerate an error to some extent, the evaluation value calculator 34 multiplies the capacitor q-axis current theoretical value $I_{qt}$ by 0.8, which is a value of the failure detection level smaller than 1, to determine the evaluation value $I'_{qt}$. As a result, even when errors are contained in the measured values to some extent, but when the AC capacitor 16 normally operates, the q-axis current $I_{qf}$ should be greater than the evaluation value $I'_{qt}$, which is the result of the multiplication by 0.8.

Nevertheless, when the q-axis current $I_{qf}$ is smaller than the evaluation value $I'_{qt}$, which is the result of the multiplication by 0.8, it is believed that some failure (abnormality) has occurred in the AC capacitor 16.

For example, when one of the AC capacitors 16a malfunctions in the form of open failure, the q-axis current $I_{qf}$ is expressed by $I_{qf}=(2/3) I_{qt} \approx 0.67 \times I_{qt}$ in accordance with Expression (3). On the other hand, the evaluation value $I'_{qt}$, which is the capacitor q-axis current theoretical value $I_{qt}$ multiplied by 0.8, which is the value of the failure detection level, is expressed by $I'_{qt}=0.8 \times I_{qt}$. Therefore, when one of the AC capacitors 16a malfunctions in the form of open failure, the q-axis current $I_{qf} \approx 0.67 \times I_{qt}$ is smaller than the evaluation value $I'_{qt}=0.8 \times I_{qt}$. The failure evaluator 35 then compares the q-axis current $I_{qf}$ with the evaluation value $I'_{qt}$ in terms of magnitude, and determines that the AC capacitor 16 malfunctions when the q-axis current $I_{qf}$ is smaller than the evaluation value $I'_{qt}$.

Figure 7B:
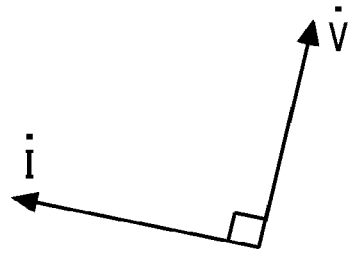

The reason why the q-axis current $I_{qf}$ becomes smaller than the evaluation value $I'_{qt}$ when abnormality occurs in the AC capacitor 16 will be described from a different perspective. In general, the value of the current flowing through the AC capacitor 16 is expressed in the form of a complex number and determined by Expression (4) below. FIG. 7B is a graphical representation of Expression (4).

[Math.4]

$$\dot{I}=j\omega C \dot{V} \qquad (4)$$

According to Expression (4), when the AC capacitor 16 malfunctions in the form of open failure, the capacitor capacitance C decreases, and the current value I also decreases in proportion thereto. The q-axis current $I_{qf}$ then also decreases. Therefore, when the AC capacitor 16 malfunctions in the form of open failure, the q-axis current $I_{qf}$ becomes smaller than the evaluation value $I'_{qt}$. According to Expression (4), the current flowing through the AC capacitor 16 is greater in magnitude by $\omega C$ and ahead by 90 degrees in terms of phase with respect to the voltage.

The failure evaluator 35 therefore compares the q-axis current $I_{qf}$ with the evaluation value $I'_{qt}$ and determines that the AC capacitor 16 malfunctions when the q-axis current $I_{qf}$ is smaller than the evaluation value $I'_{qt}$. This also means that when the capacitor capacitance C of the AC capacitor 16 decreases, the magnitude of the current also decreases, and the failure evaluator 35 uses the characteristic to detect that the AC capacitor 16 malfunctions. This further means that the failure evaluator 35 detects that the AC capacitor 16 malfunctions based on the magnitude of the current component ahead of the voltage in terms of phase by 90 degrees.

Referring back to FIG. 4, in step S61, the failure information notifier 36 of the control apparatus 30 acquires as appropriate information from the inverter controller 32 on whether or not the power conversion apparatus 1 is in the voltage matching operation (synchronous control) (see S24). When the AC capacitor is determined to malfunction by the failure evaluator 35, the failure information notifier 36 acquires "1", which is a result of the evaluation representing that the AC capacitor malfunctions, from the failure evaluator 35 (see S52). When the failure information notifier 36 acquires the information representing that the power conversion apparatus 1 is in the voltage matching operation (synchronization control) and further acquires "1", which is a result of the evaluation representing that the AC capacitor 16 malfunctions, from the failure evaluator 35, the failure information notifier 36 transitions to the process in step S62.

In step S62, when the failure information notifier 36 acquires the information representing that the power conversion apparatus 1 is in the voltage matching operation (synchronization control) and further acquires "1", which is a result of the evaluation representing that the AC capacitor 16 malfunctions, from the failure evaluator 35, the failure information notifier 36 issues the failure information. The failure information notifier 36 issues the failure information, for example, by issuing (outputting) the failure information to a higher-level apparatus that is not shown, or by issuing a warning or an alarm to a display section, an operation section, or any other section that is not shown but is provided in the power conversion apparatus 1. The failure information notifier 36 may further issue (output) the failure information to the operation controller 37. The higher-level apparatus that is not shown is, for example, an apparatus that integrally monitors and controls a plurality of power conversion apparatuses 1, and is connected to each of the power conversion apparatuses 1 via wires or wirelessly.

In step S71, when the operation controller 37 of the control apparatus 30 acquires the failure information, which represents that the AC capacitor 16 malfunctions, issued from the failure information notifier 36, the operation controller 37 issues operation instructions that instruct stoppage of the power conversion apparatus 1 to each of the sections of the power conversion apparatus 1. The operation controller 37 thus stops the power conversion apparatus 1 before the system interconnection operation starts (before AC switch 14 is turned on). Spread of the failure to normal AC capacitors 16a and transmission of harmonics toward the system 3 can thus be suppressed.

The operation controller 37 may stop the power conversion apparatus 1 when the operation controller 37 accepts an operation instruction via the operation section from the higher-level apparatus or the operator that is not shown but has acquired the failure information issued by the failure information notifier 36. For example, when the operation controller 37 acquires the information representing that the result of the synchronization evaluation is OK from the inverter controller 32 but has not acquired the failure information issued from the failure information notifier 36, the operation controller 37 may issue an operation instruction that instructs the AC switch 14 to be turned on to start the system interconnection operation.

Figure 8A:
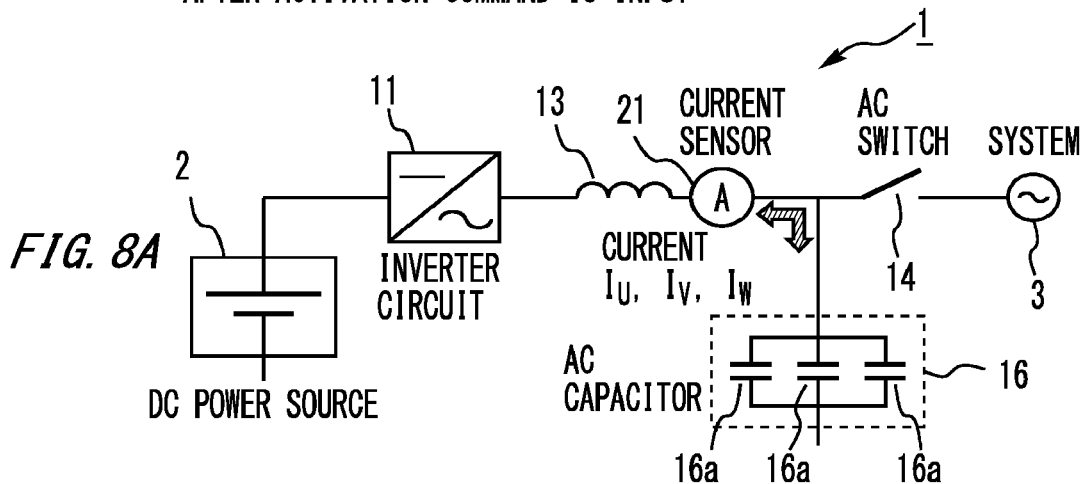
FIG. 8 shows an example of the operation of the power conversion apparatus shown in FIGS. 1 to 7.
Figure 8B:
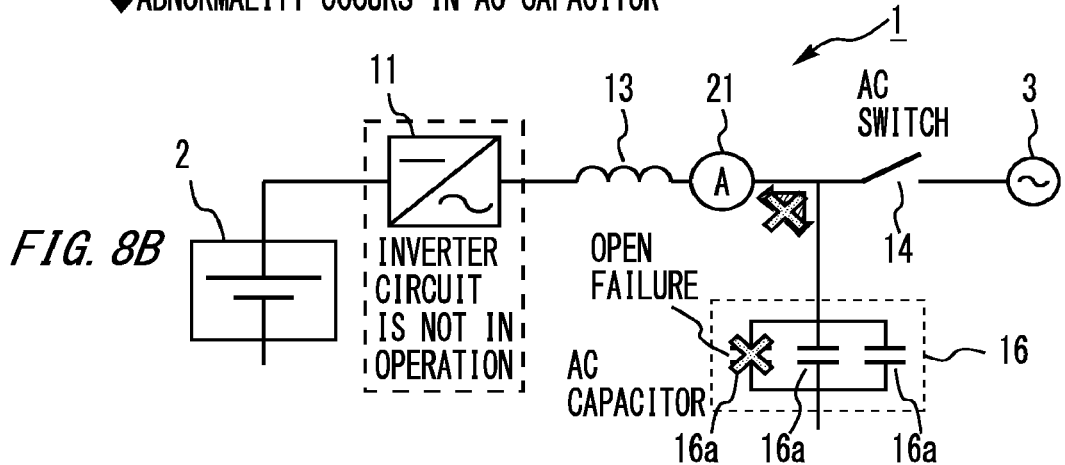

FIG. 8 shows an example of the operation of the power conversion apparatus 1 shown in FIGS. 1 to 7. FIG. 8A shows the state in which the power conversion apparatus 1 is in the voltage matching operation (synchronous control) when the AC capacitor 16 operates normally. FIG. 8B shows the state in which the power conversion apparatus 1 operates in the voltage matching operation (synchronous control) when part of the AC capacitor 16 malfunctions in the form of open failure.

In FIG. 8, in practice, the AC circuits 12 corresponding to the three phases are connected to the output side of the inverter 11, and the AC reactors 13, the AC switches 14, the AC capacitors 16, and other components corresponding to the three phases are disposed, as shown in FIG. 2. A plurality of AC capacitors 16 are in practice connected in parallel for each of the phases, as shown in FIG. 2. FIG. 8, however, does not show elements including the components described above, or shows the elements in a simplified form for simplicity of illustration.

In FIG. 8A, when the AC capacitor 16 operates normally, the power conversion apparatus 1 drives the inverter 11 (inverter circuit 11) to perform the voltage matching operation (synchronization control) immediately after accepting the activation command, and attempts to synchronize the voltage before the AC switch 14 with the voltage after the AC switch 14. At this point, since the AC switch 14 is open, the AC power output from the inverter circuit 11 is not transmitted toward the system 3, but current flows through the AC capacitor 16.

In this case, the current values $I_U$, $I_V$, and $I_W$, which are measured values of the output current from the inverter 11 measured by the three-phase current sensor 21 disposed in the three-phase AC circuit 12, are the current values $I_U$, $I_V$, and $I_W$ of the current flowing through the AC capacitor 16. That is, during the voltage matching operation (synchronous control), the current sensor 21 keeps detecting the current values $I_U$, $I_V$, and $I_W$ of the current flowing through the AC capacitor 16. At this point, the control apparatus 30 keeps performing the operation from steps S11 to S51 shown in FIG. 4.

In FIG. 8B, when part of the AC capacitor 16 malfunctions in the form of open failure, the power conversion apparatus 1 operates in the same manner as that shown in FIG. 8A. In this case, however, the control apparatus 30 determines that the AC capacitor 16 malfunctions (S51), and outputs "1", which is a result of the evaluation representing that the AC capacitor 16 malfunctions, to the failure information notifier 36 (S52). In this case, the control apparatus 30 determines that "1", which is the result of the evaluation representing that the AC capacitor 16 malfunctions, has been acquired when the power conversion apparatus 1 is in the voltage-matching operation (synchronous control) (S61), issues the failure information (S62), and stops the power conversion apparatus 1 (S71). Spread of the failure to normal AC capacitors 16a and transmission of harmonics toward the system 3 can thus be suppressed.

Effects and Advantages of First Embodiment

As described above, in the first embodiment shown in FIGS. 1 to 8, the current sensor 21 is disposed so as to be connected in series to the AC reactor 13 between the inverter 11 and the branch point 12a to the capacitor circuit 15 in the AC circuit 12 on the output side of the inverter 11. The current sensor 21 can therefore measure the current flowing through the AC capacitor 16 even during the voltage matching operation (synchronous control) in which the AC switch 14 is open. Therefore, according to the first embodiment shown in FIGS. 1 to 8, the control apparatus 30 can detect that the AC capacitor 16 malfunctions in the form of open failure during the voltage matching operation (synchronous control).

In the first embodiment shown in FIGS. 1 to 8, the current sensor 21 is disposed in the position described above. In existing power conversion apparatuses 1, the current sensor 21 is already disposed in many cases in the position described above as specified in the specification. Therefore, according to the first embodiment shown in FIGS. 1 to 8, the existing current sensor 21 having already been disposed can be used in many existing power conversion apparatuses 1.

In the first embodiment shown in FIGS. 1 to 8, the control apparatus 30 adjusts the phase angle θ in such a way that the q-axis voltage $V_q$ becomes sufficiently smaller than the d-axis voltage $V_d$ (becomes zero) (S14). The control apparatus 30 then determines the d-axis current $I_d$ and the q-axis current $I_q$ based on the adjusted phase angle θ (S32). Therefore, the d-axis current $I_d$ becomes a component in phase with the system voltage, and the q-axis current $I_q$ becomes a component ahead of the system voltage in terms of phase by 90 degrees, so that the current flowing through the AC capacitor 16 (capacitor current) only appears in the q-axis current $I_q$. Therefore, according to the first embodiment shown in FIGS. 1 to 8, the control apparatus 30 can determine that the AC capacitor 16 malfunctions by comparing the q-axis current $I_{qf}$ with the evaluation value $I'_{qt}$ (q-axis current with q-axis current) in terms of magnitude (S51).

In the first embodiment shown in FIGS. 1 to 8, the control apparatus 30 performs filtering using a lowpass filter (LPF) on the extracted q-axis current $I_q$ to determine the q-axis current $I_{qf}$ (S34). The DC offset portion caused by the current sensor 21 is thus removed, whereby noise caused by the DC offset portion can be removed. Therefore, according to the first embodiment shown in FIGS. 1 to 8, even when the AC capacitor 16 has small capacitor capacitance and therefore produce a small capacitor current, only the current flowing through the AC capacitor 16 can be extracted, whereby accurate failure evaluation can be performed.

In the first embodiment shown in FIGS. 1 to 8, the control apparatus 30 multiplies the capacitor q-axis current theoretical value $I_{qt}$ by a predetermined failure detection level value (0.8, for example), which is smaller than 1, to determine the evaluation value $I'_{qt}$ (S45). Therefore, according to the first embodiment shown in FIGS. 1 to 8, even when the q-axis current $I_{qf}$ contains an error to some extent, the error to some extent can be tolerated, whereby failure of the AC capacitor 16 can be detected.

In the first embodiment shown in FIGS. 1 to 8, when the control apparatus 30 detects that the AC capacitor 16 malfunctions during the voltage matching operation (synchronous control), the control apparatus 30 issues the failure information (S62) before the system interconnection operation starts (before AC switch 14 is turned on). Therefore, according to the first embodiment shown in FIGS. 1 to 8, spread of the failure to normal AC capacitors 16a and transmission of harmonics toward the system 3 can be suppressed.

In the first embodiment shown in FIGS. 1 to 8, when the control apparatus 30 detects that the AC capacitor 16 malfunctions during the voltage matching operation (synchronous control), the control apparatus 30 stops the power conversion apparatus 1 before the system interconnection operation starts (before AC switch 14 is turned on) (S71). Therefore, according to the first embodiment shown in FIGS. 1 to 8, spread of the failure to normal AC capacitors 16a and transmission of harmonics toward the system 3 can be suppressed.

Second Embodiment

Figure 9:
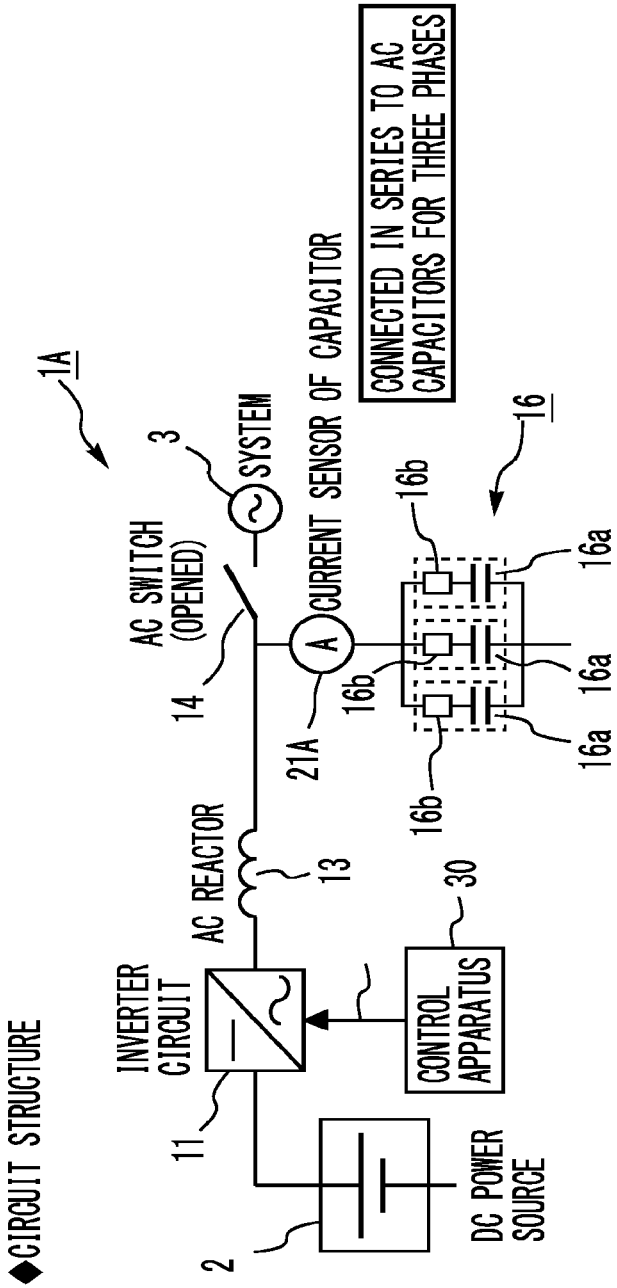
FIG. 9 shows an example of the control apparatus, the power conversion apparatus, and the method for detecting failure of the AC capacitor according to a second embodiment.

FIG. 9 shows an example of the control apparatus 30, a power conversion apparatus 1A, and the method for detecting failure of the AC capacitor 16 according to a second embodiment. In FIG. 9, the same configurations as those in the embodiment shown in FIGS. 1 to 8 have the same reference characters, and detailed description thereof will be omitted or simplified. In the configuration shown in FIG. 9, the AC circuit 12 is in practice a three-phase, three-wire AC circuit, and the components including the AC capacitor 16 are in practice provided in the three-phase AC circuit 12, as in FIG. 2. It is, however, noted in FIG. 9, that each element is shown in a simplified form for simplicity of illustration, as in FIG. 1.

In the embodiment shown in FIG. 9, unlike the embodiment shown in FIGS. 1 to 8, the current sensor 21 is not disposed in the AC circuit 12, and a current sensor 21A is disposed in the capacitor circuit 15. In the embodiment shown in FIG. 9, the current values $I_U$, $I_V$, and $I_W$ of the current flowing through the AC capacitor 16 (capacitor current) are measured by the current sensor 21A during the voltage matching operation (synchronous control) in which the AC switch 14 is open. The current values $I_U$, $I_V$, and $I_W$ measured by the current sensor 21A are then acquired by the current component extractor 33, and the same processes as those shown in FIG. 4 are carried out to evaluate whether the AC capacitor 16 malfunctions.

Effects and Advantages of Second Embodiment

As described above, the second embodiment shown in FIG. 9 provides the same effects as those provided by the first embodiment shown in FIGS. 1 to 8.

In the second embodiment shown in FIG. 9, the current sensor 21A is disposed in the capacitor circuit 15. Therefore, even when the power conversion apparatus 1A is in operation (when AC switch 14 is turned on), the current values IU, IV, and IW of the current flowing through the AC capacitor 16 (capacitor circuit 15) (capacitor current) can be measured separately from one another. Therefore, according to the second embodiment shown in FIG. 9, even when the power conversion apparatus 1A is in operation (when AC switch 14 is turned on), failure of the AC capacitor 16 can be evaluated, the failure information can be issued, and the power conversion apparatus 1A can be stopped.

In the second embodiment shown in FIG. 9, the current sensor 21A measures only the current flowing through the AC capacitor 16 (capacitor circuit 15) irrespective of whether the voltage matching operation (synchronous control) is performed or the power conversion apparatus 1A is in operation (when AC switch 14 is turned on). In the embodiment shown in FIGS. 1 to 8, the current sensor 21 disposed in the AC circuit 12 needs to produce a large rated current according to the output current from the inverter 11. On the other hand, in the second embodiment shown in FIG. 9, since only a small current flowing through the AC capacitor 16 (capacitor circuit 15) is measured, a current sensor 21A that produces a small, rated current can be used. Instead of measuring the capacitor current, which is a small current, with a current sensor 21 that produces a large rated current, measuring the capacitor current, which is a small current, with a current sensor 21A that produces a small, rated current allows more accurate measurement of the current. Therefore, according to the embodiment shown in FIG. 9, the capacitor current can be measured more accurately than in the embodiment shown in FIGS. 1 to 8.

In the second embodiment shown in FIG. 9, the current sensor 21A produces a small, rated current is used. The current sensor 21A can therefore be smaller and less expensive than the current sensor 21 used in the embodiment shown in FIGS. 1 to 8.

In the second embodiment shown in FIG. 9, the current sensor 21A is disposed in the capacitor circuit 15. Therefore, according to the embodiment shown in FIG. 9, for example, even when the current sensor 21 is disposed as specified in the specification only in a position shifted toward the system 3 from the AC switch 14 of the AC circuit 12, failure of the AC capacitor 16 can be evaluated, the failure information can be issued, and the power conversion apparatus 1A can be stopped.

<Example of Hardware Configuration>

Figure 10:
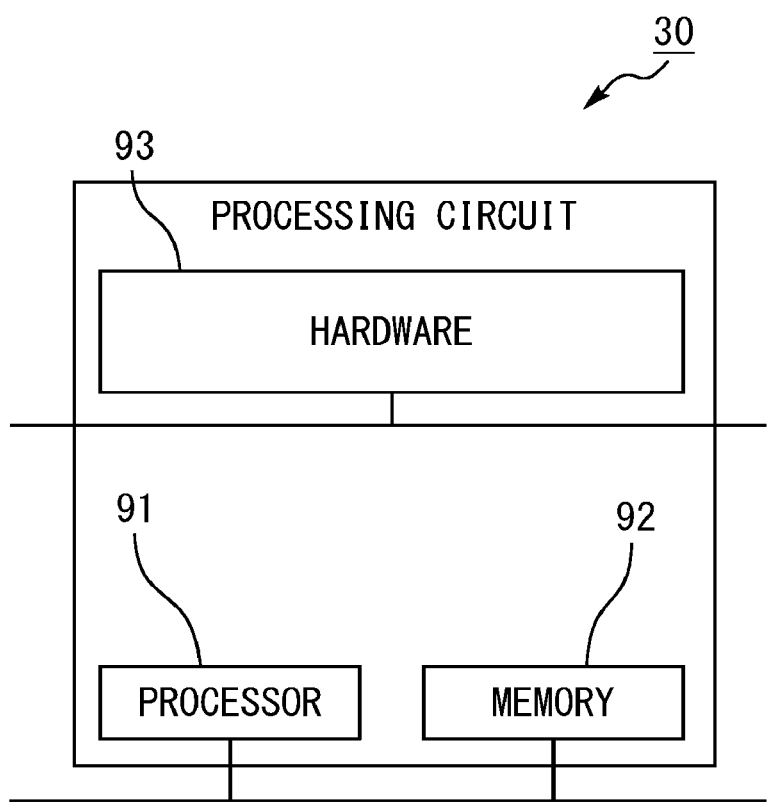
FIG. 10 is a conceptual view showing an example of the hardware configuration of a processing circuit provided in the control apparatus in the embodiments shown in FIGS. 1 to 9.

FIG. 10 is a conceptual view showing an example of the hardware configuration of a processing circuit provided in the control apparatus 30 in the embodiments shown in FIGS. 1 to 9. The functions described above are each realized by the processing circuit. As an aspect, the processing circuit includes at least one processor 91 and at least one memory 92. In another aspect, the processing circuit includes at least one dedicated piece of hardware 93.

When the processing circuit includes the processor 91 and the memory 92, the functions are realized by software, firmware, or a combination of software and firmware. At least one of the software and the firmware is written in the form of a program. At least one of the software and the firmware is stored in the memory 92. The processor 91 realizes the functions by reading and executing the program stored in the memory 92.

When the processing circuit includes the dedicated hardware 93, the processing circuit is, for example, a single circuit, a complex circuit, a programmed processor, or a combination of thereof. The functions are realized by the processing circuit.

The functions of the control apparatus 30 may be configured partially or entirely by hardware, or as a program executed by the processor. That is, the control apparatus 30 can instead be realized by a computer and a program, and the program can be stored on a storage medium or provided over a network.

Supplementary Items of Embodiments

According to the embodiments shown in FIGS. 1 to 10 described above, the first embodiment shown in FIGS. 1 to 8 and the second embodiment shown in FIG. 9 are separate from each other and may instead be combined with each other. That is, the power conversion apparatus 1 or 1A may include both the current sensor 21 and the current sensor 21A. The current flowing through the AC capacitor 16 (capacitor circuit 15) (capacitor current) may be measured by either of or both the current sensors. Even the combined embodiment can provide the same effects and advantages as those provided by the embodiments before combined with each other.

In the embodiments shown in FIGS. 1 to 10, when part of the AC capacitors 16a malfunctions in the form of open failure in step S51 shown in FIG. 4, the failure evaluator 35 determines that the AC capacitor 16 malfunctions. Instead, for example, the failure evaluator 35 may not determine that the AC capacitor 16 malfunctions when only one AC capacitor 16a malfunctions, and may determine that the AC capacitor 16 malfunctions when two or more AC capacitors 16a malfunction. The method described above is effective, for example, when only one malfunctioning AC capacitor 16a affects the power conversion apparatus 1 or 1A only by a small amount. The failure evaluator 35 may detect failure of the AC capacitor 16 when three or more AC capacitors 16a or more AC capacitors 16 malfunction in accordance with the actual conditions of the power conversion apparatus.

According to the embodiments shown in FIGS. 1 to 10, the power conversion apparatuses 1 and 1A and the control apparatus 30 provided therein have been described as an aspect of the present disclosure, but not necessarily. The present disclosure can also be realized as an AC capacitor failure detection method including process steps carried out by the sections of the control apparatus 30.

The present disclosure can also be realized as an AC capacitor failure detection program that causes a computer to carry out the process steps carried out by the sections of the control apparatus 30.

The present disclosure can also be realized as a storage medium (non-transitory computer readable medium) on which the AC capacitor failure detection program is stored. The AC capacitor failure detection program can be stored and distributed, for example, in the form of a removable disk, such as a CD (compact disc), a DVD (digital versatile disc), or USB (universal serial bus) memory. The AC capacitor failure detection program may be uploaded, for example, to a network via a network interface that is not shown but is provided in the control apparatus 30, or may be downloaded via the network and stored, for example, in the storage 40.

The features and advantages of the embodiments will become apparent from the above detailed description. It is intended that the claims extend to the features and advantages of the embodiments described above without departing from the spirit and scope of the claims. Furthermore, a person ordinarily skilled in the art should be able to easily conceive of all kinds of improvements and changes. Therefore, it is not intended to limit the scope of inventive embodiments to those described above, but the inventive embodiments may rely on suitable improvements and equivalents encompassed in the scope disclosed in the embodiments.

REFERENCE SINGS LIST 1, 1A: Power conversion apparatus
2: DC power source
3: AC power system (system)
11: Inverter (inverter circuit)
12: AC circuit (three-phase AC circuit)
12a: Branch point
13: AC reactor
14: AC switch
15: Capacitor circuit
16: AC capacitor
16a: AC capacitor
16b: Safety mechanism
21, 21A: Current sensor
22: First voltage sensor
23: Second voltage sensor
30: Control apparatus,
31: Phase angle adjuster
32: Inverter controller
33: Current component extractor
34: Evaluation value calculator
Failure evaluator (comparator)
36: Failure information notifier
37: Operation controller
40: Storage
C, Ca: Capacitor capacitance
f: Frequency
I, $I_U$, $I_V$, $I_W$: Current value
$I'_{qt}$: Evaluation value
$I''_{qt}$: Capacitor current
$I_d$: d-axis current
$I_q$, $I_{qf}$: q-axis current
$I_{qt}$: Capacitor q-axis current theoretical value
$V_i$, $V_U$, $V_V$, $V_W$: Voltage value
$V_d$, $V_{id}$: d-axis voltage
$V_q$: q-axis voltage
$V_i^*$, $V_U^*$, $V_V^*$, $V_W^*$: Inverter output voltage command value
θ: Phase angle

The invention claimed is:

1. A control apparatus for a power conversion apparatus including at least one AC capacitor disposed on an output side of an inverter and disconnected from a circuit when the AC capacitor malfunctions, the control apparatus comprising:

a current component extractor that acquires current values of a current flowing through the AC capacitor during synchronization control that synchronizes an output voltage from the inverter with a system voltage of a system, the synchronization control performed during activation of the power conversion apparatus with an AC switch on a side facing the system open, and extracts a value of a current component having a frequency synchronized with a frequency of the output voltage from the inverter out of the current values;

a failure evaluator that compares the value of the current component extracted by the current component extractor with a predetermined evaluation value in terms of magnitude, and determines that the AC capacitor malfunctions when the value of the current component is smaller than the predetermined evaluation value; and a failure information notifier that issues failure information representing that the AC capacitor malfunctions when the failure evaluator determines that the AC capacitor malfunctions during the synchronization control.

2. The control apparatus according to claim 1, further comprising an evaluation value calculator that acquires a voltage value of the output voltage from the inverter and determines the evaluation value used to evaluate the failure based on the voltage value, wherein the failure evaluator compares the value of the current component extracted by the current component extractor with the evaluation value determined by the evaluation value calculator in terms of magnitude, and determines that the AC capacitor malfunctions when the value of the current component is smaller than the predetermined evaluation value.

3. The control apparatus according to claim 2, wherein the value of the current component is a value of a q-axis current that is a value of a component having a phase 90 degrees ahead of a phase of the output voltage from the inverter, the value determined by dq-conversion performed on the current value by using a phase angle controlled based on the system voltage.

4. The control apparatus according to claim 2, wherein the value of the current component is a value from which predetermined noise has been removed by using a predetermined lowpass filter.

5. The control apparatus according to claim 2, wherein the evaluation value is a q-axis current theoretical value that is a value of a component having a phase 90 degrees ahead of a phase of the output voltage from the inverter, the value determined based on a voltage value of the output voltage from the inverter and a value of rated conductance of the AC capacitor.

6. The control apparatus according to claim 2, wherein the evaluation value is a value that tolerates a predetermined error based on a value multiplied by a predetermined failure detection level.

7. The control apparatus according to claim 1, wherein the value of the current component is a value of a q-axis current that is a value of a component having a phase 90 degrees ahead of a phase of the output voltage from the inverter, the value determined by dq-conversion performed on the current value by using a phase angle controlled based on the system voltage.

8. The control apparatus according to claim 7, wherein the value of the current component is a value from which predetermined noise has been removed by using a predetermined lowpass filter.

9. The control apparatus according to claim 7, wherein the evaluation value is a q-axis current theoretical value that is a value of a component having a phase 90 degrees ahead of a phase of the output voltage from the inverter, the value determined based on a voltage value of the output voltage from the inverter and a value of rated conductance of the AC capacitor.

10. The control apparatus according to claim 7, wherein the evaluation value is a value that tolerates a predetermined error based on a value multiplied by a predetermined failure detection level.

11. The control apparatus according to claim 1, wherein the value of the current component is a value from which predetermined noise has been removed by using a predetermined lowpass filter.

12. The control apparatus according to claim 11, wherein the evaluation value is a q-axis current theoretical value that is a value of a component having a phase 90 degrees ahead of a phase of the output voltage from the inverter, the value determined based on a voltage value of the output voltage from the inverter and a value of rated conductance of the AC capacitor.

13. The control apparatus according to claim 1, wherein the evaluation value is a q-axis current theoretical value that is a value of a component having a phase 90 degrees ahead of a phase of the output voltage from the inverter, the value determined based on a voltage value of the output voltage from the inverter and a value of rated conductance of the AC capacitor.

14. The control apparatus according to claim 1, wherein the evaluation value is a value that tolerates a predetermined error based on a value multiplied by a predetermined failure detection level.

15. The control apparatus according to claim 1, further comprising an operation controller that outputs an operation instruction that instructs the power conversion apparatus to stop operating when the failure evaluator determines that the AC capacitor malfunctions during the synchronous control.

16. A power conversion apparatus comprising:
an inverter that converts power and outputs AC power;
at least one AC capacitor that is provided in a capacitor circuit that branches off a three-phase AC circuit on an output side of the inverter and is disconnected from the circuit when the AC capacitor malfunctions;
a current sensor that acquires a current value of a current flowing through the AC capacitor during the synchronization control; and
the control apparatus according to claim 1,
wherein the current component extractor extracts the value of the current component based on the current value acquired by the current sensor.

17. The power conversion apparatus according to claim 16, wherein the current sensor is disposed in series connection with an AC reactor between the inverter and a branch point to the capacitor circuit in the three-phase AC circuit on the output side of the inverter.

18. The power conversion apparatus according to claim 17, wherein the current sensor is disposed in the capacitor circuit that branches off the three-phase AC circuit on the output side of the inverter.

19. The power conversion apparatus according to claim 16, wherein the current sensor is disposed in the capacitor circuit that branches off the three-phase AC circuit on the output side of the inverter.

20. A method for detecting failure of an AC capacitor in a power conversion apparatus including the AC capacitor disposed on an output side of an inverter and disconnected from a circuit when the AC capacitor malfunctions, the method comprising:
a current component extraction step of acquiring current values of a current flowing through the AC capacitor during synchronization control that synchronizes an output voltage from the inverter with a system voltage of a system, the synchronization control performed during activation of the power conversion apparatus with an AC switch on a side facing the system open, and extracting a value of a current component having a frequency synchronized with a frequency of the output voltage from the inverter out of the current values;
a failure evaluation step of comparing the value of the current component extracted in the current component extraction step with a predetermined evaluation value in terms of magnitude, and determining that the AC capacitor malfunctions when the value of the current component is smaller than the predetermined evaluation value; and
a failure information notification step of issuing failure information representing that the AC capacitor malfunctions when the failure evaluation step determines that the AC capacitor malfunctions during the synchronization control.

* * * * *